United States Patent
Kowis

(10) Patent No.: US 7,051,695 B1
(45) Date of Patent: May 30, 2006

(54) VALVE COVER FASTENER AND METHOD

(76) Inventor: Albert L. Kowis, 1339 Green Oak Dr., Houston, TX (US) 77032

( * ) Notice: Subject to any disclaimer, the term of this patent is extended or adjusted under 35 U.S.C. 154(b) by 103 days.

(21) Appl. No.: 10/834,796

(22) Filed: Apr. 30, 2004

(51) Int. Cl.
*F02F 7/00* (2006.01)

(52) U.S. Cl. ............... 123/195 C; 123/90.38; 411/536; 411/350; 403/337; 403/408.1

(58) Field of Classification Search .......... 403/335, 403/337, 408.1; 411/536, 544, 350; 123/90.38, 123/195 C
See application file for complete search history.

(56) References Cited

U.S. PATENT DOCUMENTS

| | | | |
|---|---|---|---|
| 3,461,769 A * | 8/1969 | Brosseit ............... 411/385 |
| 4,027,644 A * | 6/1977 | Timour ............... 123/198 E |
| 4,066,058 A * | 1/1978 | Anderkay ............ 123/198 E |
| 4,215,664 A * | 8/1980 | Hatz .................. 123/195 C |
| 4,456,268 A | 6/1984 | Penn et al. |
| 5,184,698 A | 2/1993 | Coffenberry |
| 5,209,018 A | 5/1993 | Heinrich |
| 5,628,601 A | 5/1997 | Pope |
| 5,655,489 A * | 8/1997 | Kammerer et al. ...... 123/90.38 |
| 5,702,218 A | 12/1997 | Onofrio |
| 6,338,591 B1 | 1/2002 | Lilienthal, II |

\* cited by examiner

*Primary Examiner*—Daniel P. Stodola
*Assistant Examiner*—Michael P. Ferguson

(57) ABSTRACT

A valve cover fastener includes a bolt including an elongated threaded rod and a bolt head. The rod has a bottom end and a top end. The bolt head is integrally coupled to the top end. A nut is threadably coupled to the rod such that the nut is positioned between the bolt head and the bottom end of the rod. The bottom end of the bolt may be extended through a valve cover and a gasket and threadably coupled to an engine block so that the nut abuts the gasket. A spring is positioned on the bolt. The spring has a generally frusto-conical shape. An upper end of the spring has a smaller diameter than the bolt head. The upper end abuts the bolt head and the lower end abuts the gasket such that the spring biases the gasket away from the bolt head.

4 Claims, 2 Drawing Sheets

VALVE COVER FASTENER AND METHOD

BACKGROUND OF THE INVENTION

1. Field of the Invention

The present invention relates to securing devices and more particularly pertains to a new securing device for ensuring a tight fit between a valve cover and an engine block.

2. Description of the Prior Art

The use of securing devices is known in the prior art. Bolts, nails, screws and the like have been in use for many years. Spring biased securing members are also known as is shown in U.S. Pat. No. 6,338,591. Unique shapes of fasteners are also utilized as shown in U.S. Pat. No. 4,456,268.

While these devices fulfill their respective, particular objectives and requirements, the need remains for a fastener that retains a tight seal between a valve cover and an engine block. Typically, the seal is maintained with a valve cover gasket. However, deterioration of the valve cover gasket due to heat and age can cause the gasket to shrink and thereby allow gaps between the valve cover and the engine block. A securing device is needed that will keep the valve cover in a tight relationship with the engine.

SUMMARY OF THE INVENTION

The present invention meets the needs presented above by generally comprising a bolt including an elongated threaded rod and a bolt head. The rod has a bottom end and a top end. The bolt head is integrally coupled to the top end. A nut is threadably coupled to the rod such that the nut is positioned between the bolt head and the bottom end of the rod. The bottom end of the bolt may be extended through a valve cover and a gasket and threadably coupled to an engine block so that the nut abuts the gasket. A spring is positioned on the bolt. The spring has a generally frusto-conical shape. An upper end of the spring has a smaller diameter than the bolt head. A lower end of the spring has a diameter larger than the nut. The upper end abuts the bolt head and the lower end abuts the gasket such that the spring biases the gasket away from the bolt head.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
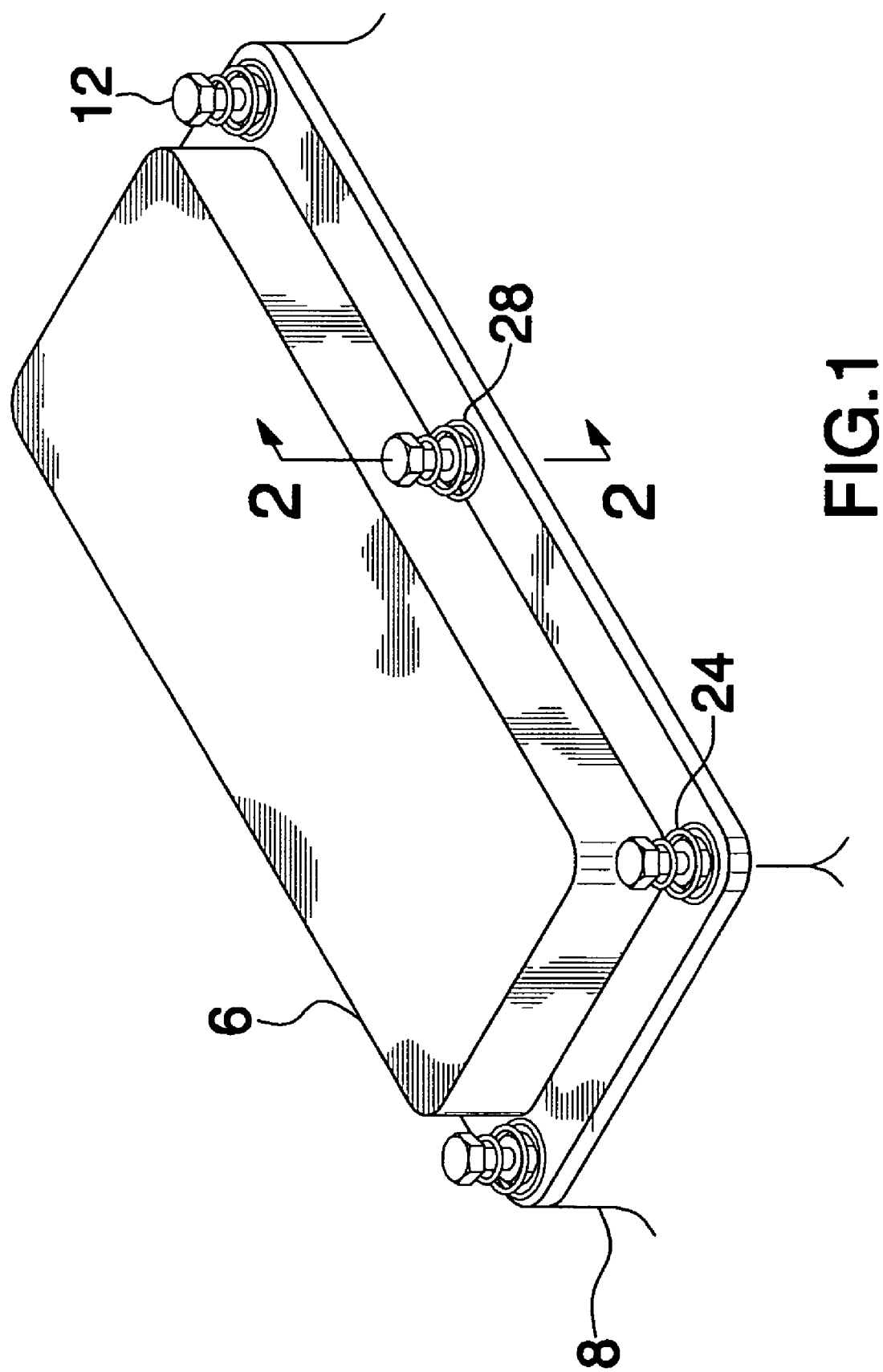
FIG. 1 is a perspective view of a valve cover fastener and method according to the present invention.
Figure 2:
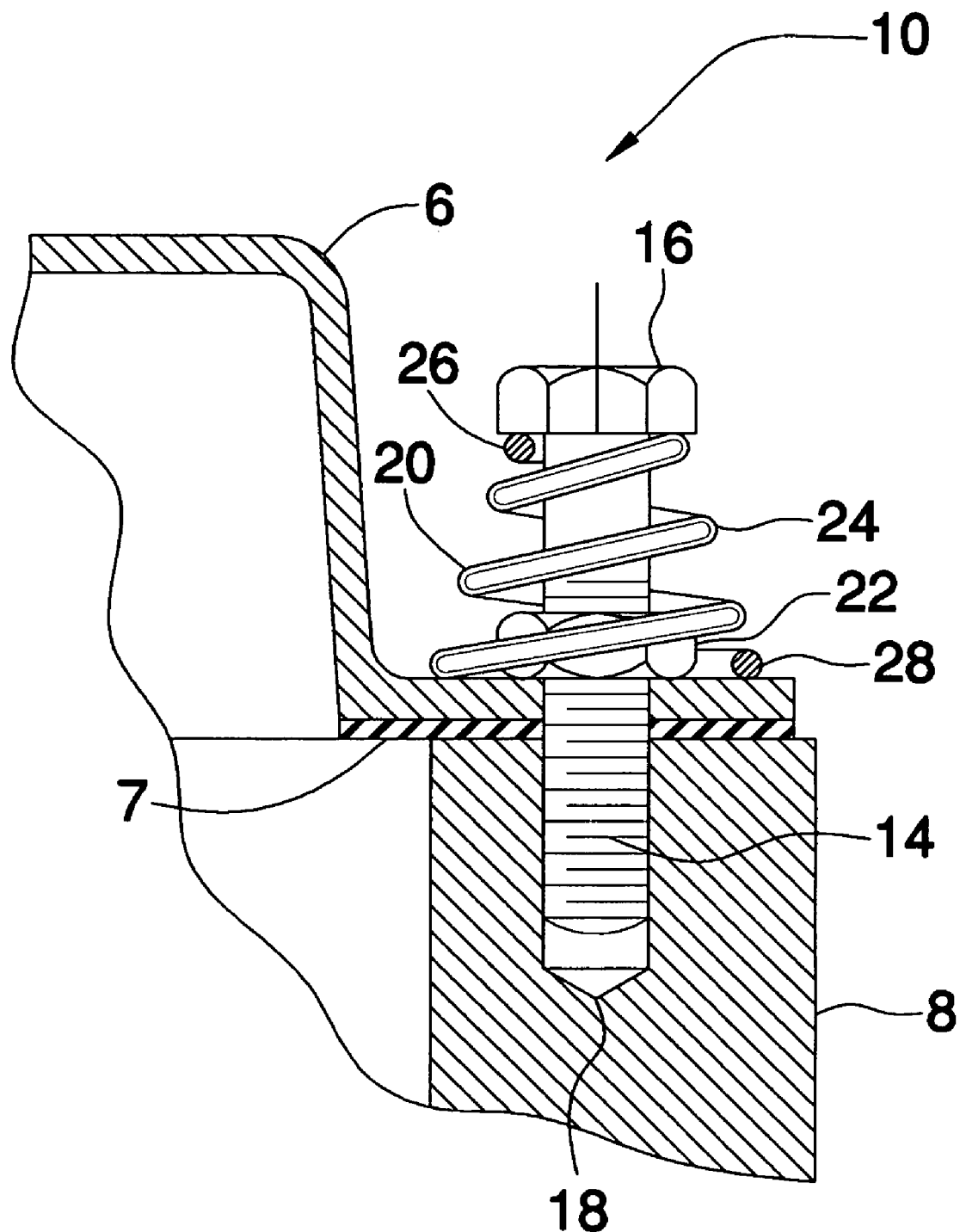
FIG. 2 is a cross-sectional view taken along line 2—2 of FIG. 1 of the present invention.

With reference now to the drawings, and in particular to FIGS. 1 and 2 thereof, a new securing device embodying the principles and concepts of the present invention and generally designated by the reference numeral 10 will be described.

As best illustrated in FIGS. 1 and 2, the valve cover fastener and method 10 generally includes a generally conventional bolt 12 that includes an elongated threaded rod 14 and a bolt head 16. The rod 14 has a bottom end 18 and a top end 20. The bolt head 16 is integrally coupled to the top end 20. The bolt 12 preferably has a length substantially equal to 1¼ inches and the rod 14 preferably has a width substantially equal to ¼ inch. It is understood that alternate measurements, particularly with respect to the width may be suitable depending on vehicle model. A nut 22 is threadably coupled to the rod 14 such that the nut 22 is positioned between the bolt head 16 and the bottom end 18 of the rod 14.

A spring 24 is positioned on the bolt. The spring 24 has a generally frusto-conical shape as shown in FIG. 2. An upper end 26 of the spring 24 has a smaller diameter than the bolt head 16 and a lower end 28 of the spring 24 has a diameter larger than the nut 22. It is preferred that the lower end 28 of the spring 24 has a diameter greater than ½ inch and the upper end 26 of the spring 24 has a diameter less than ½ inch. The spring 24 preferably has a non-compressed height from the upper end 26 to the lower end 28 greater than ¾ inch.

In use, the bottom end 18 of the rod 14 is extended through a valve cover 6 and a gasket 7 and into an engine block 8. The rod 14 is threadably coupled to the engine block 8 so that the nut 22 abuts the valve cover 6. The positioning of the springs 24 ensures that the upper end 26 abuts the bolt head 16 and the lower end 28 extends around the nut 14 so that it abuts the valve cover 6. This causes the spring 24 to bias the valve cover 6 away from the bolt head 16 to ensure a tight fit between the valve cover 6 and the engine block 8 even if the gasket 7 should shrink with age.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for removably securing a valve cover and gasket to an engine block comprising the steps of:

providing a bolt including an elongated threaded rod and a bolt head, said rod having a bottom end and a top end, said bolt head being integrally coupled to said top end;

providing a nut being threadably coupled to said rod such that said nut is positioned between said bolt head and said bottom end of said rod;

providing a spring being positioned on said bolt, said spring having a generally frusto-conical shape, an upper end of said spring having a smaller diameter than said bolt head, a lower end of said spring having a diameter larger than said nut; and extending said bottom end of said rod through the valve cover and gasket and into the engine block such that the rod is threadably coupled to the engine block and the nut abuts the valve cover, said upper end abuts said bolt head and said lower end abuts the valve cover such said spring biases valve cover away from the bolt head.

2. The method according to claim 1, wherein said bolt has a length generally equal to 1¼ inches and said rod has a diameter substantially equal to ¼ inch.

3. The method according to claim 2, wherein said lower end of said spring has a diameter greater than ½ inch and said upper end of said spring has a diameter less than ½ inch.

4. The method according to claim 2, wherein said spring has a non-compressed height from the upper end to the lower end greater than ¾ inch.

* * * * *